(12) United States Patent
Jett et al.

(10) Patent No.: US 9,985,422 B2
(45) Date of Patent: May 29, 2018

(54) UNIVERSAL POLE MOUNTING ASSEMBLY FOR MOUNTING AN ENCLOSURE TO A POLE

(71) Applicant: Hubbell Incorporated, Shelton, CT (US)

(72) Inventors: Drew Aaron Jett, Belleville, IL (US); Donald Wayne Nicholas, III, Staunton, IL (US)

(73) Assignee: Hubbell Incorporated, Shelton, CT (US)

( * ) Notice: Subject to any disclaimer, the term of this patent is extended or adjusted under 35 U.S.C. 154(b) by 64 days.

(21) Appl. No.: 15/273,901

(22) Filed: Sep. 23, 2016

(65) Prior Publication Data

US 2018/0090916 A1 Mar. 29, 2018

(51) Int. Cl.
*H02B 1/50* (2006.01)
*F16M 13/02* (2006.01)

(52) U.S. Cl.
CPC ............... *H02B 1/50* (2013.01); *F16M 13/02* (2013.01)

(58) Field of Classification Search
CPC ........ F16L 3/137; G09F 15/0037; G09F 7/18; H05K 5/0204
See application file for complete search history.

(56) References Cited

U.S. PATENT DOCUMENTS

| | | | |
|---|---|---|---|
| 3,241,800 A | 3/1966 | Richter, III | |
| 4,325,529 A | 4/1982 | Seebinger | |
| 5,340,069 A * | 8/1994 | Niemeyer | F21V 21/116 248/214 |
| 5,426,577 A | 6/1995 | Gordin et al. | |
| 5,505,416 A | 4/1996 | Dodge | |
| 6,283,425 B1 | 9/2001 | Liljevik | |
| 6,486,399 B1 | 11/2002 | Armstrong et al. | |
| 6,550,170 B1 | 4/2003 | Cooper et al. | |
| 6,766,992 B1 | 7/2004 | Parker | |
| 6,969,034 B2 | 11/2005 | Ware et al. | |
| 6,988,697 B2 | 1/2006 | Ware et al. | |
| 7,059,572 B2 | 6/2006 | Ware et al. | |
| 7,314,205 B2 | 1/2008 | Pickens | |
| 7,572,975 B2 | 8/2009 | Ruihley | |
| 8,534,623 B2 | 9/2013 | Crow et al. | |
| 8,668,175 B2 | 3/2014 | Koleszar | |

FOREIGN PATENT DOCUMENTS

WO 2010045979 10/2008

OTHER PUBLICATIONS

TerraWave product sheet "Ventev, Enclosure Mounting Specifications", http://www.terra-wave.com/pdf/Enclosure%20Mounting%20Spec%20Sheet.pdf.
Ensto Brochure, "Pole mounting brackets. for plastic and metal enclosures", Oct. 2012, 2 pages.

* cited by examiner

*Primary Examiner* — Bradley Duckworth
(74) *Attorney, Agent, or Firm* — Wissing Miller LLP

(57) ABSTRACT

Universal pole mounting assemblies and kits for mounting enclosures, such as electrical enclosures, to poles, such as utility poles is provided. Each pole mounting assembly includes a pair of arms, a mounting member and a pole mounting member. The pair of arms can be adjusted to fit the width of an enclosure to use existing mounting holes in the enclosure. The mounting member can be secured to the arms and can mate with the pole mounting member either after the pole mounting member is secured to a pole or before the pole mounting member is secured to a pole.

26 Claims, 7 Drawing Sheets

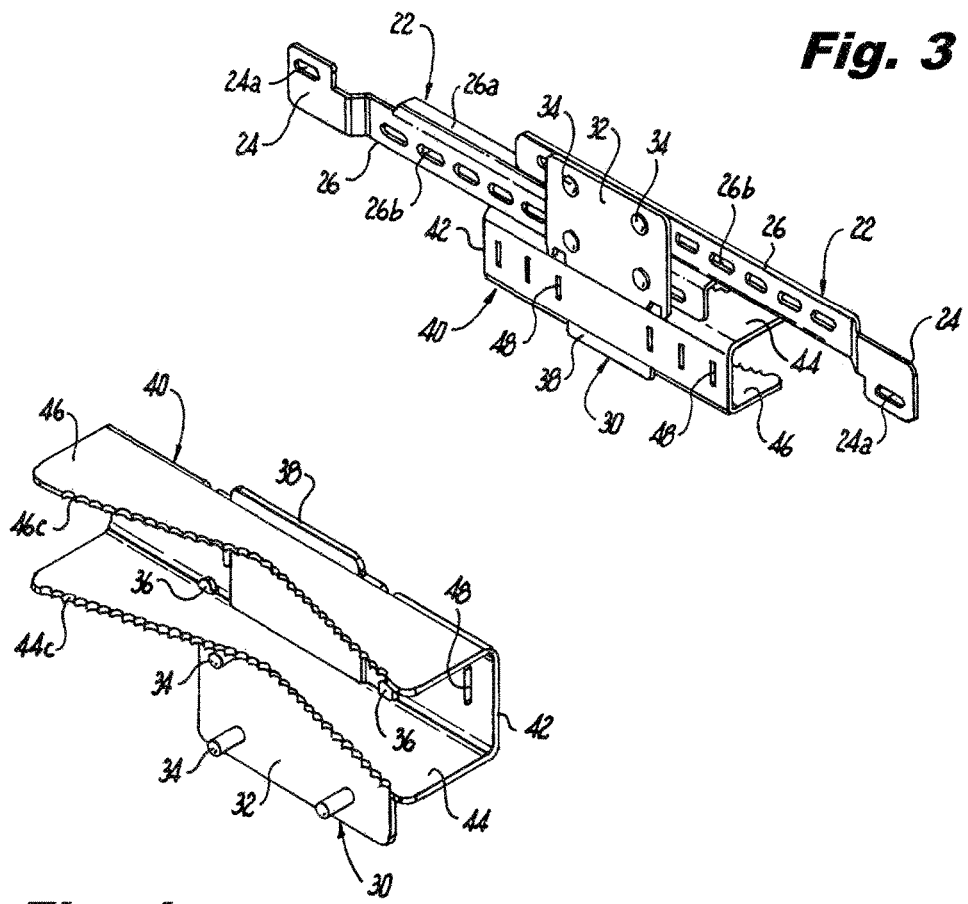

UNIVERSAL POLE MOUNTING ASSEMBLY FOR MOUNTING AN ENCLOSURE TO A POLE

BACKGROUND

Field

The present disclosure relates in general to assemblies and kits for mounting enclosures to poles, columns and posts, and more specifically to universal pole mounting assemblies and kits for mounting enclosures of different sizes to poles, columns and posts.

Description of the Related Art

Relatively large poles erected to elevate objects, such as lights, power lines, and signs, often need enclosures mounted to the pole to house equipment, such as electrical equipment, mechanical equipment, cabling and/or other equipment. Examples of electrical equipment include ballasts, switches, capacitors, and controllers. Examples of mechanical equipment include switching mechanisms. Examples of cabling include electrical cabling and fiber optic cabling used for electrical and telecommunication applications. The equipment is housed and shielded from direct access for safety reasons and to protect the equipment from environmental conditions and vandalism.

Such poles may come in a wide variety of diameters, shapes, and materials. For example, the poles may be round poles, square poles, rectangular poles or they may be octagonal or hexagonal shaped poles. The poles may be hollow steel poles, wooden poles or concrete poles. Utility poles are often wooden or hollow steel poles. The outer perimeter of such poles, e.g., the diameter of such poles, may differ depending on the desired or required height of objects being supported by the pole and environmental conditions. Likewise, the enclosures can come in a variety of sizes and shapes depending upon the application, with no substantially uniformity between them.

There are numerous ways to mount or attach enclosures to a pole, however, practicalities often drive the mounting solution. Practicalities that often drive the mounting solution include cost to manufacture, cost to install, reliability, durability, and resistance to environmental conditions. Since there is no substantial uniformity between enclosure types, the assemblies used to mount such enclosures to poles is often limited to a dedicated mounting assembly that is unique to a particular enclosure or a particular pole shape. In addition, existing mounting assemblies typically necessitate a two-person crew to install, which adds to the cost to install the enclosures.

Thus, there is a need for a universal, adjustable, quick hang pole mounting kit for mounting enclosures to poles.

SUMMARY

The present disclosure provides configurations of pole mounting assemblies and kits for mounting enclosures to poles, such as utility poles, columns or posts. The pole mounting kits are universal and include one or more pole mounting assemblies used to secure an enclosure to a pole, columns or posts.

In one exemplary configuration, a pole mounting assembly comprising an arm assembly, a mounting member and a pole mounting member. The arm assembly has a mounting portion for securing the arm assembly to an enclosure and an adjustable elongated alignment portion. The mounting member has an arm connection portion and a bracket mating portion. The arm connection portion can be secured to the adjustable elongated alignment portion of the arm assembly. The pole mounting member has at least one cut-out for receiving the bracket mating portion of the mounting member.

In an exemplary configuration, the pole mounting assembly comprises a first arm and a second arm. The first arm has a first mounting portion for securing the first arm to one side of an enclosure and a first elongated alignment portion. The second arm has a second mounting portion for securing the second arm to another side of the enclosure and a second elongated alignment portion. The first and second elongated alignment portions include a plurality of holes for connecting the first and second elongated alignment portions to the arm connection portion of the mounting member.

In one exemplary configuration, the pole mounting kit comprising a first pole mounting assembly and a second mounting assembly. The pole mounting kit may also include a pair of bands, clamps or straps used to secure the pole mounting assemblies to for example a pole, column or post.

BRIEF DESCRIPTION OF THE DRAWINGS

The figures depict configurations for purposes of illustration only. One skilled in the art will readily recognize from the following description that alternative configurations of the structures illustrated herein may be employed without departing from the principles described herein, wherein:

FIG. 3 is a perspective view of a pole mounting assembly of FIG. 2, illustrating a pole mounting bracket, a mounting plate and a pair of arms;

FIG. 4 is a perspective view of the pole mounting bracket of FIG. 3 coupled to the mounting plate;

FIG. 5 is a front elevation view of the pole mounting bracket and the mounting plate of FIG. 4;

DETAILED DESCRIPTION

The present disclosure provides configurations of pole mounting assemblies and kits for mounting enclosures, such as electrical enclosures, to poles, such as utility poles, columns or posts. More specifically, the present disclosure provides a universal pole mounting kit that includes one or more pole mounting assemblies used to secure an enclosure to a pole, columns or posts. Each pole mounting assembly includes a pair of arms, a mounting member and a pole mounting member. The pair of arms can be adjusted to fit the width of an enclosure to use existing mounting holes in the enclosure. The mounting member can be secured to the arms and can mate with the pole mounting member either before or after the pole mounting member is attached to a pole, column or post. The adjustable nature of the pair of arms allows the pole mounting assembly to fit enclosures of varying widths so that the pole mounting assembly is not limited to any specific enclosure. Once the arms and mounting plate of a pole mounting assembly are attached to the enclosure, the enclosure can slide onto a mating pole mounting member that is for example secured to a pole, column or post. In such a configuration a single person can mount an enclosure to a pole by first sliding the mounting member of a first pole mounting assembly into the pole mounting member of the first pole mounting assembly so that the weight of the enclosure is supported by the first pole mounting assembly. A second pole mounting assembly can then be used to secure the bottom of the enclosure to for example the pole, column or post.

Figure 1:
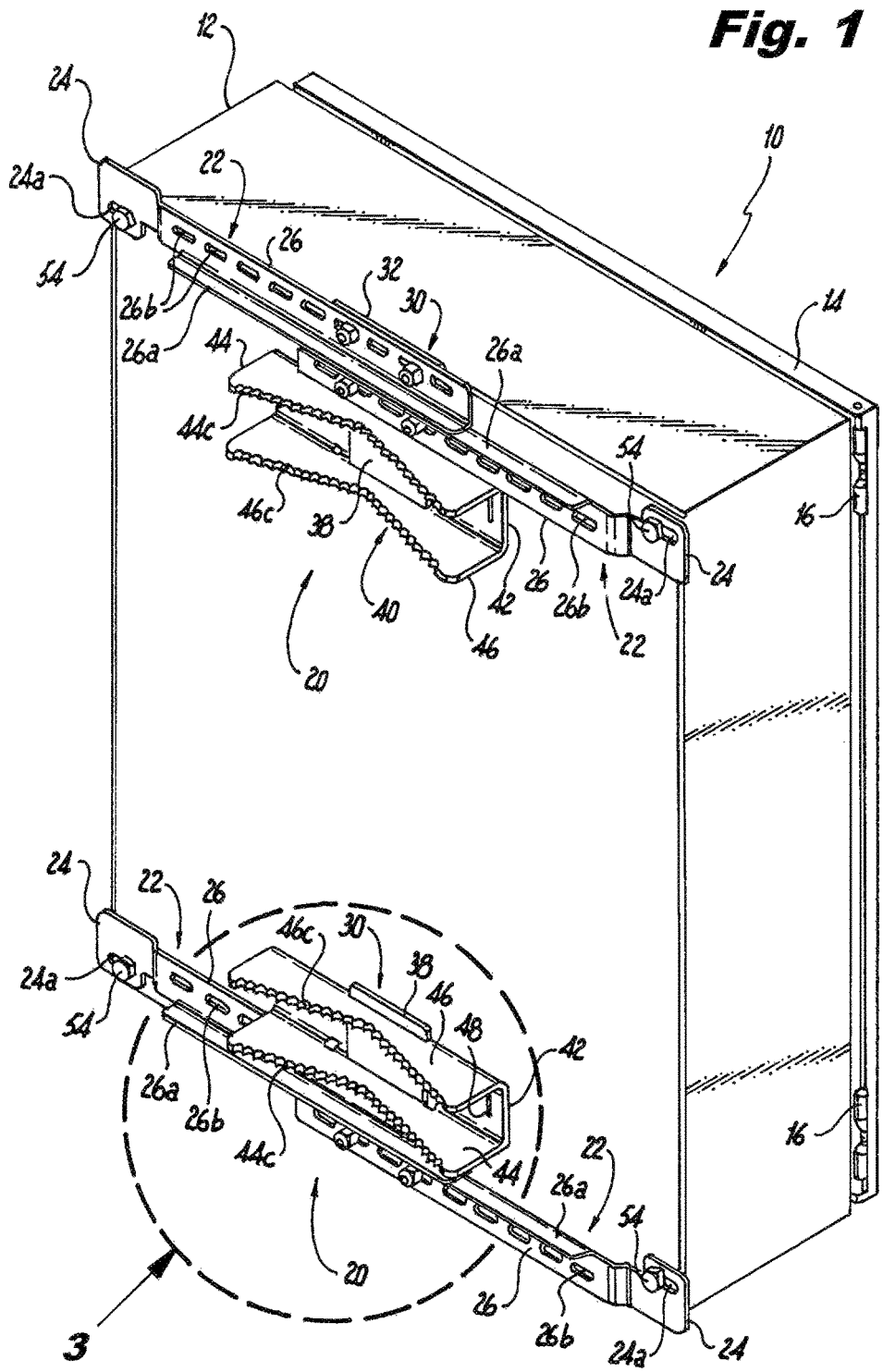
FIG. 1 is a perspective view of an exemplary configuration of an enclosure and a pair of pole mounting assemblies according to the present disclosure for mounting the enclosure to a pole.
Figure 2:
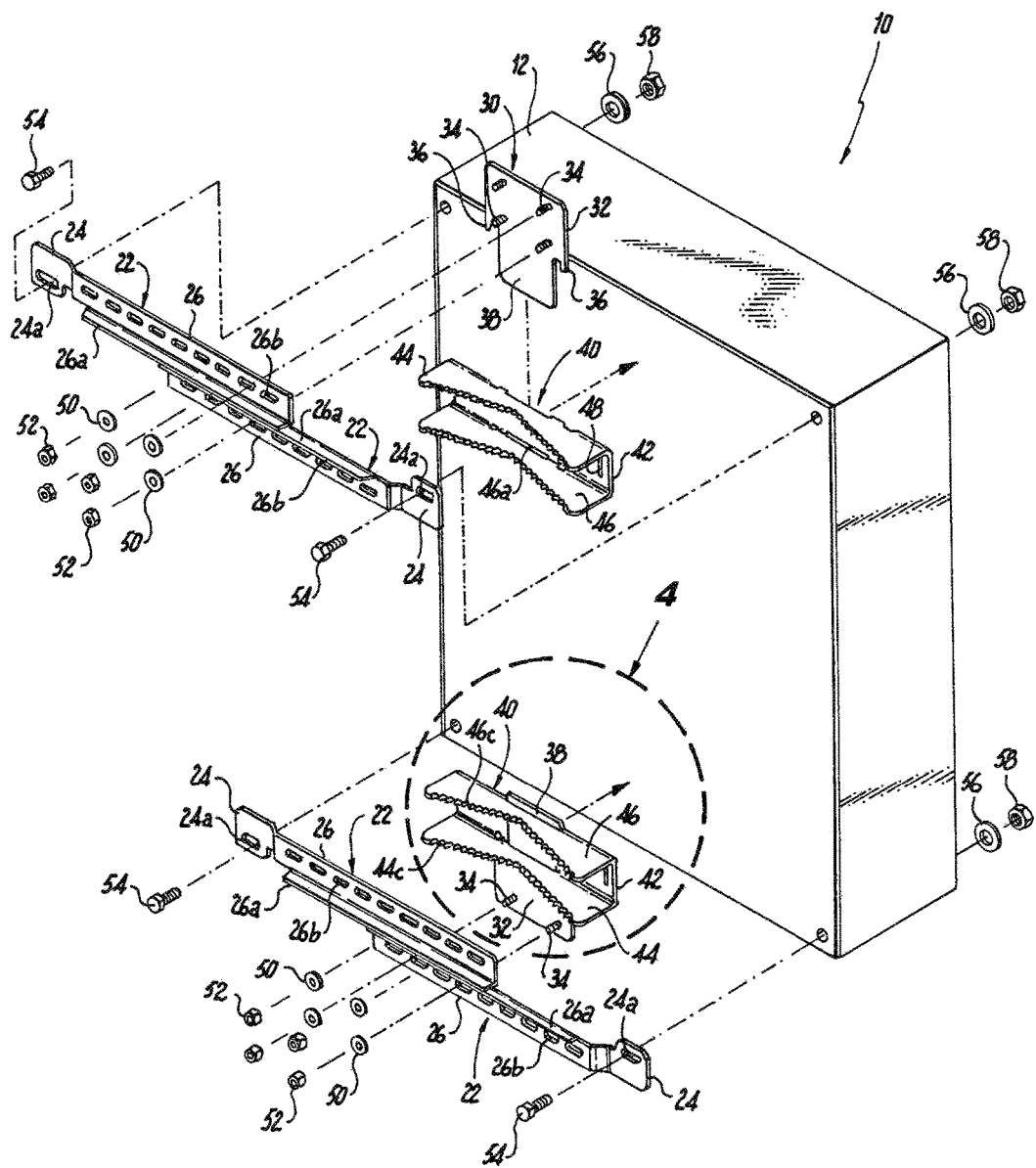
FIG. 2 is a perspective view of the enclosure and pole mounting assemblies of FIG. 1 with the parts of the pole mounting assemblies separated.

Referring to FIGS. 1 and 2, an exemplary configuration of an enclosure 10 and a pair of pole mounting assemblies 20 used to mount the enclosure to for example a pole, column or post are shown. The enclosure 10 can have any shape, but typically is square or rectangular in shape. The enclosure 10 includes a box 12 and a cover 14 secured to the box 10 using hinges 16 so that the cover 14 is movable between an open position permitting access to the interior of the box 12 and a closed position sealing the interior of the box from the environment. The enclosure 10 may include a lock assembly (not shown) to lock the cover 14 to the box 12 to limit access to the box interior. In another exemplary configuration, the box may have mounting tabs with threaded holes in for example the corners of the box, and the cover may be a plate having mounting holes in the corners of the plate that align with the threaded mounting holes in the mounting tabs. The cover plate can then be secured to the mounting tabs in the box 12 with fasteners, such as stainless steel machine screws. The rear surface of the box 12 typically includes pre-formed mounting holes 18, e.g., pre-drilled or pre-punched mounting holes, that are used to mount the enclosure 10 to a support structure, such as a wall. One skilled in the art would readily appreciate that the mounting holes may be drilled or punched at the job site instead of being preformed.

Referring to FIGS. 1-5, each pole mounting assembly 20 includes a pair of arms 22, a mounting member 30 and a pole mounting member 40. In the exemplary configuration shown, each arm 22 includes a mounting portion 24 and an elongated alignment portion 26. The mounting portion 24 has a hole 24a, e.g., an obround hole, used to secure the arm 22 to the box 12. The elongated alignment portion 26 is preferably offset from the mounting portion 24 so that the mounting member 30 can fit between the box 12 and the elongated alignment plates 26 when the arms 22 are secured to box 12. The elongated alignment portion 26 may have a substantially perpendicular flange 26a. The flange 26a of each elongated alignment portion 26 is configured to rest against the other when installed to provide additional stability and strength to the arms 22. The elongated alignment portion 26 includes one or more holes 26b, e.g., obround holes, that are used to secure the arm 22 to the mounting member 30 as will be described below.

The arms 22 can be made of a metallic material or a non-metallic material. Examples of metallic materials include stainless steel, galvanized steel and aluminum. Examples of non-metallic materials include rigid plastic materials, such as polyvinyl chloride, injection molded plastics, such as high density polyethylene and nylon, or composite materials, such as carbon fiber composite materials. In the embodiment shown, the arms are made from stainless steel.

The mounting member 30 in the exemplary configuration shown is a T-shaped like plate having an arm connection portion 32 and a bracket mating portion 38. The arm connection portion 32 includes a plurality of studs 34 used to secure the mounting member 30 to the arms 22. The studs 34 are preferably threaded studs that are integrally formed into the arm connection portion 32 or secured to the arm connection portion by for example spot welding. At the junction between the arm connection portion 32 and the bracket mating portion 38, the arm connection portion includes guide tabs 36 that can mate with the pole mounting member 40, as described below, to align the mounting member 30 with the pole mounting member 40. The bracket mating portion 38 of the mounting member 30 is configured to slide into the pole mounting member 40.

The mounting member 30 can be made of a metallic material or a non-metallic material. Examples of metallic materials include stainless steel, galvanized steel and aluminum. Examples of non-metallic materials include rigid plastic materials, such as polyvinyl chloride, injection molded plastics, such as high density polyethylene and nylon, or composite materials, such as carbon fiber composite materials. In the embodiment shown, the mounting member 30 is made from stainless steel.

The pole mounting member 40 in the configuration shown in FIGS. 3-5 has a base 42 and walls 44 and 46 extending from the base and substantially perpendicular to the base forming a U-shaped type bracket. The base 42 includes a plurality of holes 48, e.g., a plurality of obround holes or slots, that can receive a band, clamp or strap used to secure the pole mounting member 40 to for example a pole, column or post. At the junction between the base 42 and wall 44, the wall 44 has a cut-out 44a, e.g., a slot, (seen in FIG. 6) configured to receive the bracket mating portion 38 of the mounting member 30. Similarly, at the junction between the base 42 and wall 46, the wall 46 has a cut-out 46a, which is similar to slot 44a and configured to receive the bracket mating portion 38 of the mounting member 30. Thus, the walls 44 and 46 of the pole mounting member 40 have cut-outs so that the mounting member 30 can slide into one of the wall cut-outs 44a or 46a and pass through the other wall cut-out. Wall 44 also includes tab slots 44b at the junction between the base 42 and the wall 44. The tab slots are configured to receive guide tabs 36 on the mounting plate 30. Similarly, wall 46 may also include tab slots, similar to tab slots 44b (seen in FIG. 6), at the junction between the base 42 and the wall 46. Having walls 44 and 46 with tab slots allows the pole mounting member 40 to be positioned so that either tab slots 44b on wall 44 mate with the guide tabs 36, or the tab slots on wall 46 mate with the guide tabs 36. The guide tabs and tab slots align the mounting member 30 with the pole mounting member 40 when installing the enclosure 10 to for example a pole, column or post.

Referring to FIGS. 4 and 5, the walls 44 and 46 preferably have a V-shape that permit the pole mounting member 40 to mate with for example poles, columns or posts having different shapes, such as round, rectangular and square poles, columns or posts. When an enclosure 10 is mounted to for example a pole, column or post, the free end 44c of wall 44 and the free end 46c of wall 46 contact the pole, column or post. The free ends 44c and 46c of the walls can be serrated to enable the pole mounting member 40 to better grip the pole, thus limiting or preventing the enclosure 10 from sliding along the pole, column or post when installed.

The pole mounting member 40 can be made of a metallic material or a non-metallic material. Examples of metallic materials include stainless steel, galvanized steel and aluminum. Examples of non-metallic materials include rigid plastic materials, such as polyvinyl chloride, injection molded plastics, such as high density polyethylene and nylon, or composite materials, such as carbon fiber composite materials. In the embodiment shown, the pole mounting member 40 is made from stainless steel.

Figure 6:
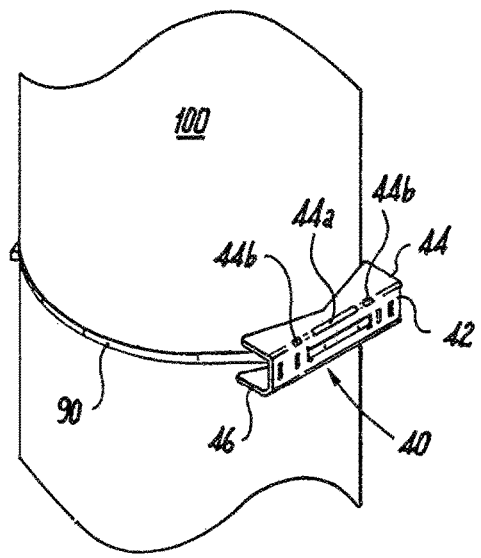
FIG. 6 is a perspective view of the pole mounting bracket of FIG. 4 secured to a utility pole using a hose clamp.
Figure 7:
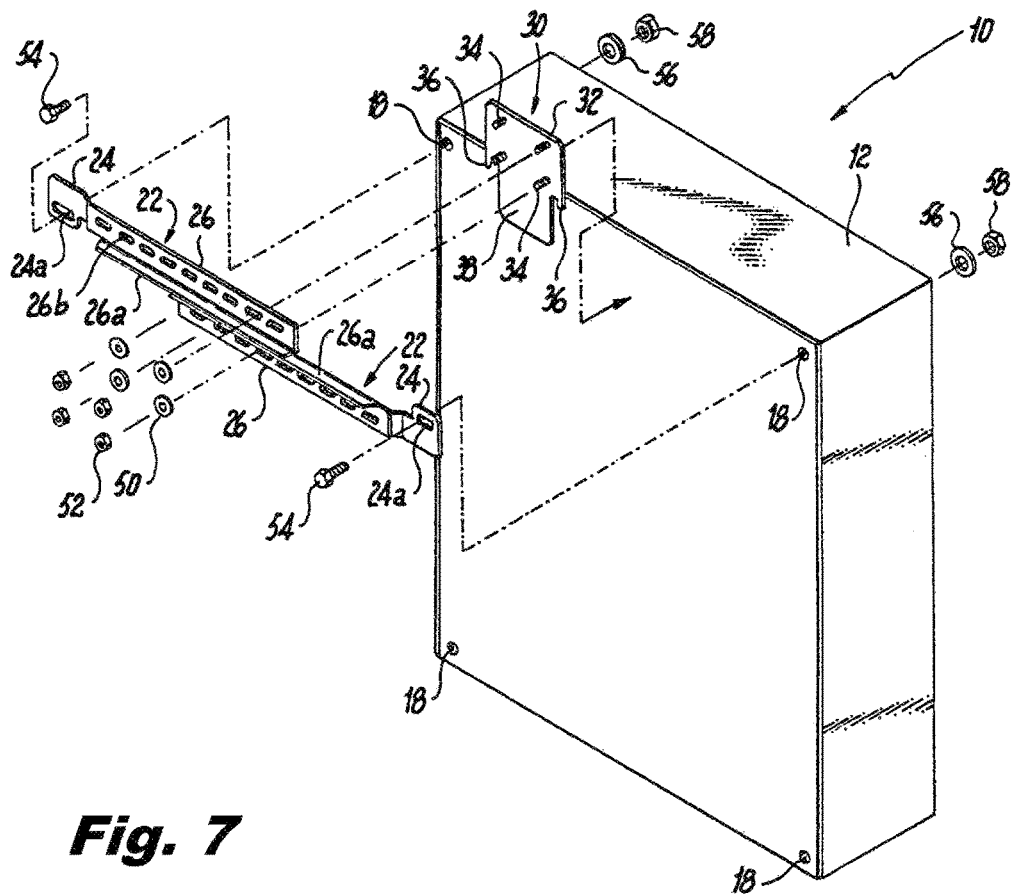
FIG. 7 is a perspective view of the enclosure of FIG. 1 and an exploded view of the pair of arms and mounting plate of a pole mounting assembly of FIG. 2.
Figure 8:
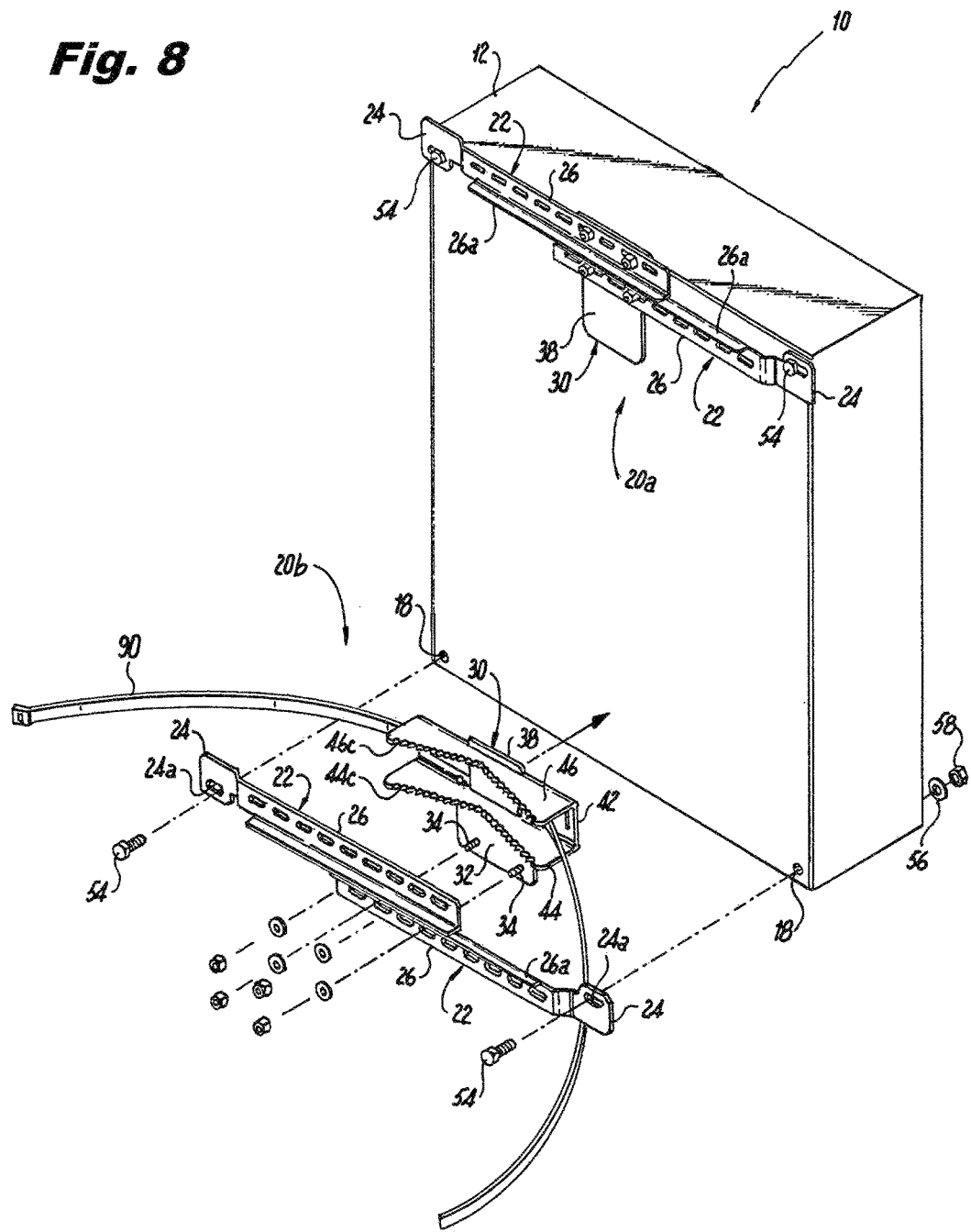
FIG. 8 is a perspective view of the enclosure of FIG. 1 with the pair of arms and mounting plate of a first pole mounting assembly secured to the top of the enclosure, and a second pole mounting assembly with parts separated to be secured to the enclosure.

Referring now to FIGS. 6-9, installation of the pole mounting assemblies 20 onto an enclosure 10 and the mounting of the enclosure to for example a pole will be described. Initially, a pole mounting member 40 of a first pole mounting assembly 20a is secured to a pole 100 using a quick release hose clamp 90, as shown in FIG. 6. In this example, the pole 100 is a utility pole. The arms 22 of the first pole mounting assembly 20a are then positioned so that the flange 26a of each elongated alignment portion 26 are in contact and so that holes 24a in each mounting portion 24 are aligned with a respective mounting hole 18 in a top end of the box 12 of the enclosure 10, as shown in FIG. 7. The studs 34 in the arm connection portion 32 of the enclosure mounting member 30 are then inserted into corresponding holes 26b of the elongated alignment portions 26 and the arms 22 are secured to the mounting member 30 using washers 50 and nuts 52, as seen in FIG. 7. The arms 22 and enclosure mounting member 30 are then secured to the top of box 12 of enclosure 10 by passing bolts 54 through the mounting holes 18 in the box 12, and then securing the arms 22 to the box with washers 56 and nuts 58, as shown in FIGS. 7 and 8. The washers 56 are preferably sealing washers, such as neoprene washers, that inhibit water from entering the interior of the box 12.

Figure 9:
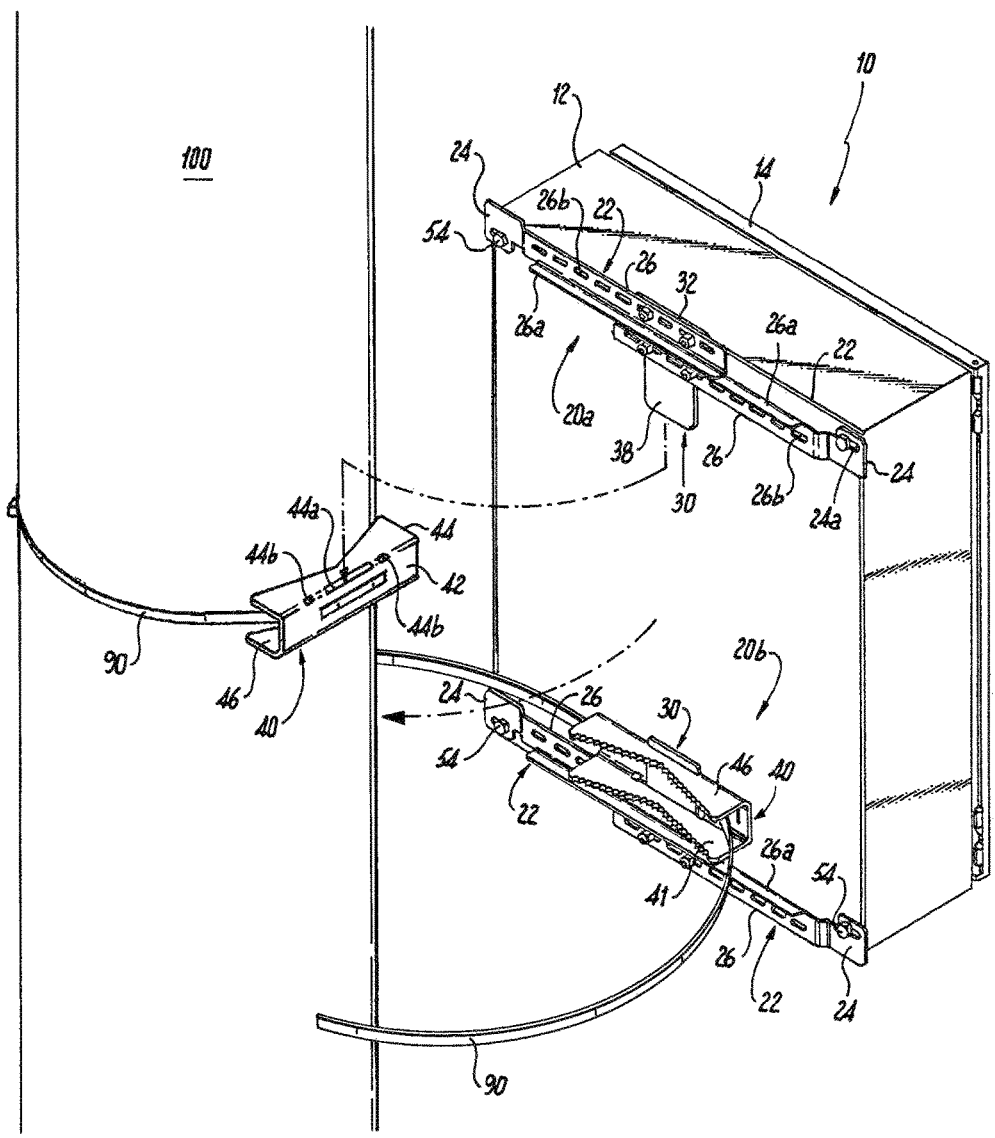
FIG. 9 is a perspective view of the enclosure and pole mounting assemblies of FIG. 8 being secured to a utility pole.

Once the first pole mounting assembly is secured to the box and pole as described above, a second pole mounting assembly 20b is secured to the box 12. More specifically, a bracket mating portion 38 of the mounting member 30 of the second pole mounting assembly 20b is inserted through slots 44a and 46a in walls 44 and 46 of a pole mounting member 40 of the second pole mounting assembly 20b. The bracket mating portion 38 is then secured to the pole mounting member 40 using for example spot welds or fasteners. With the mounting member 30 secured to the pole mounting member 40, the arms 22 of the second pole mounting assembly 20b are then positioned so that the flange 26a of each elongated alignment portion 26 are in contact and so that holes 24a in each mounting portion 24 are aligned with a respective mounting hole 18 in a bottom end of the box 12 of the enclosure 10, as shown in FIG. 8. The studs 34 in the arm connection portion 32 of the mounting member 30 are then inserted into corresponding holes 26b of the elongated alignment portions 26. The arms 22 are then secured to the mounting member 30 using washers 50 and nuts 52, as seen in FIG. 8. The arms 22 and mounting member 30 are then secured to the bottom of box 12 of enclosure 10 by passing bolts 54 through the holes 24a in each mounting portion 24 and through the mounting holes 18 in the bottom of the box 12, and then securing the arms 22 to the box with washers 56 and nuts 58, as shown in FIGS. 8 and 9. As noted above, the washers 56 are preferably sealing washers, such as neoprene washers, that inhibit water from entering the interior of the box 12.

Referring to FIG. 9, with the mounting member 40 of the first pole mounting assembly 20a secured to a pole, the installer can then slide the bracket mating portion 38 of the first mounting member 30 through the cut-outs 44a and 46a in walls 44 and 46 of the pole mounting member 40 of the first pole mounting assembly 20a so that the top of the enclosure is attached to the pole 100 and the pole mounting member supports the weight of the enclosure 10. The installer is then free to secure the pole mounting member 40 of the second pole mounting assembly 20b to the bottom of the enclosure 10 using a using a quick release hose clamp 90, as shown in FIG. 9.

Figure 10:
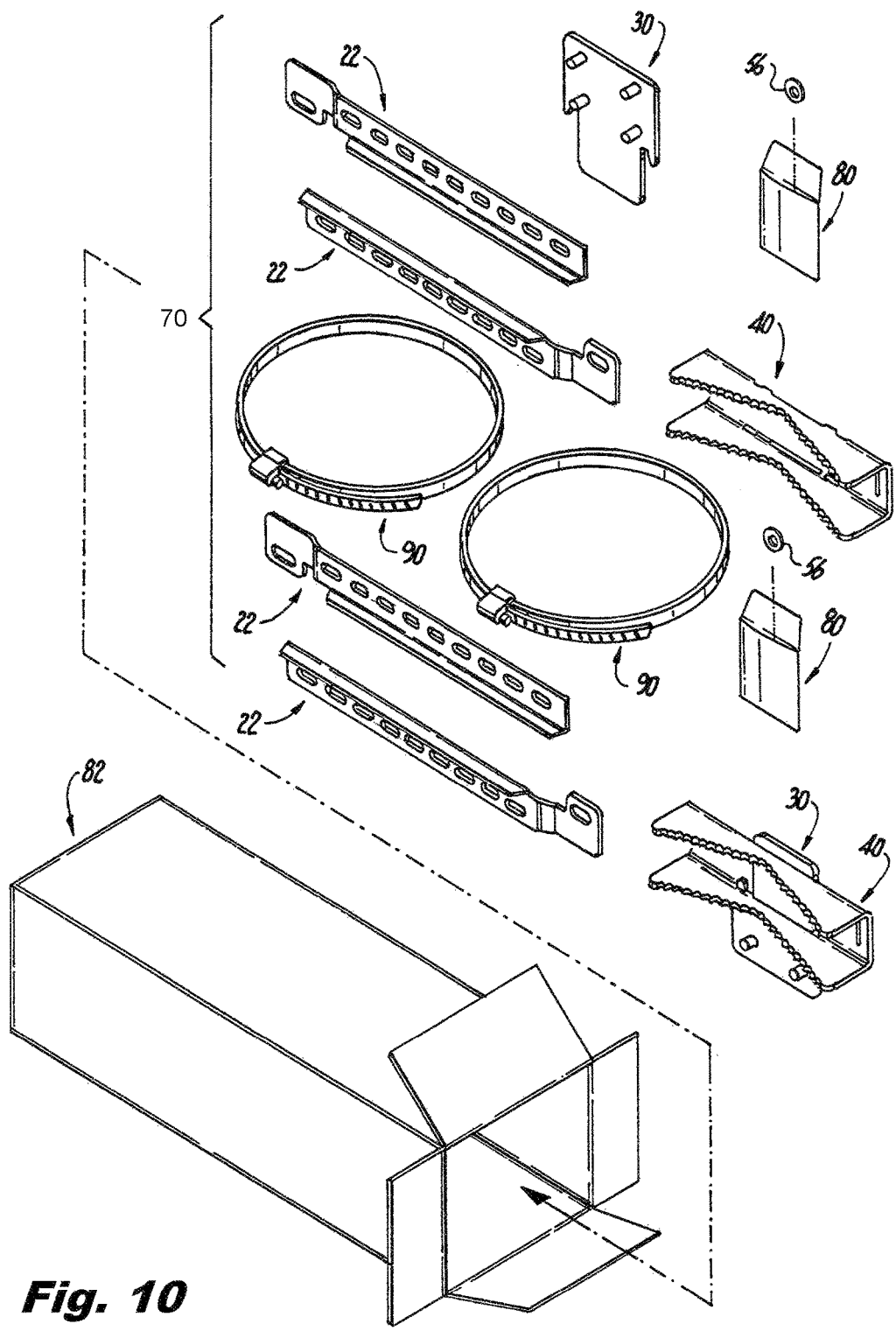
FIG. 10 is a perspective view of a pole mounting kit according to the present disclosure.

Referring to FIG. 10, and exemplary configuration of a pole mounting kit 70 according to the present disclosure is shown. In this exemplary configuration, the pole mounting kit includes a pair of pole mounting assemblies 20 each having a pair of arms 22, a mounting member 30 and a pole mounting member 40 which are described above. The pole mounting kit 70 may also include the hardware 80 that includes the nuts, bolts and washers used to assemble the pole mounting assemblies 20 and to secure the pole mounting assemblies to the enclosure as described herein. The pole mounting kit 70 may be packaged in a box 82 for easy customer pickup.

The pole mounting assemblies according to the present disclosure are configured so that they can be secured to either the top or bottom of an enclosure and to fit different size enclosures such that the pole mounting assemblies are interchangeable and adjustable. The pole mounting assemblies according to the present disclosure also allow for a single person to install or mount the enclosure to for example a pole, column or post thus decreasing the cost to install enclosures. While illustrative embodiments have been described and illustrated above, it should be understood that these are exemplary and are not to be considered as limiting. Additions, deletions, substitutions, and other modifications can be made without departing from the spirit or scope of the present disclosure. Accordingly, the invention is not to be considered as limited by the foregoing description.

What is claimed is:

1. A pole mounting assembly comprising:
   an arm assembly having a mounting portion for securing the arm assembly to an enclosure and an adjustable elongated alignment portion;
   a mounting member having an arm connection portion and a bracket mating portion, wherein the arm connection portion can be secured to the adjustable elongated alignment portion of the arm assembly; and
   a pole mounting member that can be secured to a pole, the pole mounting member having at least one cut-out for receiving the bracket mating portion of the mounting member.

2. The pole mounting assembly according to claim 1, wherein the arm assembly comprises:
   a first arm having a first mounting portion for securing the first arm to one side of an enclosure and a first elongated alignment portion; and
   a second arm having a second mounting portion for securing the second arm to another side of the enclosure and a second elongated alignment portion; and
   wherein the first and second elongated alignment portions include a plurality of holes for connecting the first and second elongated alignment portions to the arm connection portion of the mounting member.

3. The pole mounting assembly according to claim 1, wherein the arm assembly is made of a metallic material.

4. The pole mounting assembly according to claim 1, wherein the mounting member further comprises at least one tab used to align the mounting member with the pole mounting member when the bracket mating portion of the mounting member is received by the pole mounting member.

5. The pole mounting assembly according to claim 1, wherein the mounting member comprises a plate.

6. The pole mounting assembly according to claim 1, wherein the mounting member is made of a metallic material.

7. The pole mounting assembly according to claim 1, wherein the pole mounting member comprises a base having a plurality of openings used when securing the pole mounting member to a pole, a first wall extending from the base and a second wall extending from the base, wherein the first and second walls are substantially parallel to each other, and wherein the first and second walls are shaped to mate with poles of various perimeter dimensions.

8. The pole mounting assembly according to claim 7, wherein the first wall includes a cut-out to receive the bracket mating portion of the mounting member.

9. The pole mounting assembly according to claim 7, wherein the second wall includes a cut-out to receive the bracket mating portion of the mounting member.

10. A pole mounting assembly comprising:
an arm assembly comprising:
a first arm having a first mounting portion for securing the first arm to one side of an enclosure, and a first elongated alignment portion having a plurality of holes; and
a second arm having a second mounting portion for securing the second arm to another side of the enclosure, and a second elongated alignment portion having a plurality of holes;
a mounting member having an arm connection portion and a bracket mating portion, wherein the arm connection portion can be secured to the first arm using at least one of the plurality of holes in the first elongated alignment portion and to the second arm using at least one of the plurality of holes in the second elongated alignment portion; and
a pole mounting member that can be secured to a pole, the pole mounting member having at least one cut-out for receiving the bracket mating portion of the mounting member.

11. The pole mounting assembly according to claim 10, wherein the arm assembly is made of a metallic material.

12. The pole mounting assembly according to claim 10, wherein the mounting member further comprises at least one tab used to align the mounting member with the pole mounting member when the bracket mating portion of the mounting member is received by the pole mounting member.

13. The pole mounting assembly according to claim 10, wherein the mounting member comprises a plate.

14. The pole mounting assembly according to claim 10, wherein the mounting member is made of a metallic material.

15. The pole mounting assembly according to claim 10, wherein the pole mounting member comprises a base having a plurality of openings used when securing the pole mounting member to a pole, a first wall extending from the base and a second wall extending from the base, wherein the first and second walls are substantially parallel to each other, and wherein the first and second walls are shaped to mate with poles of various perimeter dimensions.

16. The pole mounting assembly according to claim 15, wherein the first wall includes a cut-out to receive the bracket mating portion of the mounting member.

17. The pole mounting assembly according to claim 15, wherein the second wall includes a cut-out to receive the bracket mating portion of the mounting member.

18. A pole mounting kit comprising:
a first pole mounting assembly comprising:
an arm assembly having a mounting portion for securing the arm assembly to an enclosure and an adjustable elongated alignment portion;
a mounting member having an arm connection portion and a bracket mating portion, wherein the arm connection portion can be secured to the adjustable elongated alignment portion of the arm assembly; and
a pole mounting member that can be secured to a pole, the pole mounting member having at least one cut-out for receiving the bracket mating portion of the mounting member; and
a second pole mounting assembly comprising:
an arm assembly having a mounting portion for securing the arm assembly to an enclosure and an adjustable elongated alignment portion;
a mounting member having an arm connection portion and a bracket mating portion, wherein the arm connection portion can be secured to the adjustable elongated alignment portion of the arm assembly; and
a pole mounting member that can be secured to a pole, the pole mounting member having at least one cut-out for receiving the bracket mating portion of the mounting member.

19. The pole mounting kit according to claim 18, wherein the arm assembly of the first pole mounting assembly and the second pole mounting assembly comprises:
a first arm having a first mounting portion for securing the first arm to one side of an enclosure and a first elongated alignment portion; and
a second arm having a second mounting portion for securing the second arm to another side of the enclosure and a second elongated alignment portion; and
wherein the first and second elongated alignment portions include a plurality of holes for connecting the first and second elongated alignment portions to the arm connection portion of the mounting member.

20. The pole mounting kit according to claim 18, wherein the arm assembly of the first pole mounting assembly and the second pole mounting assembly is made of a metallic material.

21. The pole mounting kit according to claim 18, wherein the mounting member of the first pole mounting assembly and the second pole mounting assembly further comprises at least one tab used to align the mounting member with the pole mounting member when the bracket mating portion of the mounting member is received by the pole mounting member.

22. The pole mounting assembly according to claim 18, wherein the mounting member of the first pole mounting assembly and the second pole mounting assembly comprises a plate.

23. The pole mounting assembly according to claim 18, wherein the mounting member of the first pole mounting assembly and the second pole mounting assembly is made of a metallic material.

24. The pole mounting assembly according to claim 18, wherein the pole mounting member of the first pole mounting assembly and the second pole mounting assembly comprises:
  a base having a plurality of openings used when securing the pole mounting member to a pole;
  a first wall extending from the base; and
  a second wall extending from the base;
  wherein the first and second walls are substantially parallel to each other, and wherein the first and second walls are shaped to mate with poles of various perimeter dimensions.

25. The pole mounting assembly according to claim 24, wherein the first wall of the first pole mounting assembly and the second pole mounting assembly includes a cut-out to receive the bracket mating portion of the mounting member of the first pole mounting assembly or the second pole mounting assembly.

26. The pole mounting assembly according to claim 24, wherein the second wall of the first pole mounting assembly and the second pole mounting assembly includes a cut-out to receive the bracket mating portion of the mounting member of the first pole mounting assembly or the second pole mounting assembly.

* * * * *